United States Patent [19]

Kubista

[11] Patent Number: 5,374,861
[45] Date of Patent: Dec. 20, 1994

[54] DIFFERENTIAL TERMINATION NETWORK FOR DIFFERENTIAL TRANSMITTERS AND RECEIVERS

[75] Inventor: Thomas T. Kubista, Eagan, Minn.
[73] Assignee: Unisys Corporation, Blue Bell, Pa.
[21] Appl. No.: 118,920
[22] Filed: Sep. 10, 1993
[51] Int. Cl.$^5$ ............................................ H03K 17/16
[52] U.S. Cl. ...................................... 326/30; 326/63; 326/14
[58] Field of Search ............... 307/442–443, 307/475, 494, 296.1; 375/76

[56] References Cited

U.S. PATENT DOCUMENTS

| | | | |
|---|---|---|---|
| 4,567,384 | 1/1986 | Stuhlmiller | 307/442 |
| 4,782,300 | 11/1988 | Bonaccio et al. | 324/509 |
| 4,943,739 | 7/1990 | Slaughter | 307/443 |
| 5,111,080 | 5/1992 | Mizukami et al. | 307/475 |
| 5,159,212 | 10/1992 | Beautils et al. | 307/442 |
| 5,220,211 | 6/1993 | Christopher et al. | 307/475 X |

FOREIGN PATENT DOCUMENTS 0156723  6/1990  Japan ................... 307/443

OTHER PUBLICATIONS

Leon and Walton, "Simultaneous Two-Way Transmission Over Coaxial Line", *IBM T.D.B.*, vol. 12, No. 8, Jan. 1970 p. 1180.

*Primary Examiner*—David R. Hudspeth
*Attorney, Agent, or Firm*—Steven R. Funk; Charles A. Johnson; Mark T. Starr

[57] ABSTRACT

A system of terminating a differential transmission line is described, where the differential transmitter and differential receiver are supplied by different power sources. The termination circuit comprises an unbalanced voltage divider pair, a connection to the receiver's voltage source, an adjustable threshold voltage, and circuitry to reduce power consumption. An unbalanced voltage divider pair provides matched termination impedances, and prevents undesired receiver output upon loss of transmitter signals. The voltage supplying the unbalanced voltage divider pair provides a voltage differential at the receiver inputs upon loss of the transmitter power source. An adjustable threshold voltage provides the minimum receiver input threshold voltage on which the transmitter signals can be superimposed. Power consumption is reduced through the use of a current limiter, which is coupled with a high pass filter to maintain the characteristic impedance of the transmission line during high frequency transmission.

11 Claims, 5 Drawing Sheets

DIFFERENTIAL TERMINATION NETWORK FOR DIFFERENTIAL TRANSMITTERS AND RECEIVERSSEP

BACKGROUND OF THE INVENTION

1. Field of the Invention

This invention relates to digital transmission line termination circuits, and more particularly, to a termination network which combines the functionality of a terminating impedance with protection to the digital transmitter/receiver circuitry, protection from faulty differential receiver output due to its loss of input, and compatibility with various differential receiver technologies.

2. Description of the Prior Art

It is known that termination networks are necessary for digital circuits operating at very high frequencies. High speed logic circuits can produce digital pulses with logic level transitions of very short duration, which in turn can cause reflections or "ringing" on the signal path if these transition times approach the propagation delay of the transmission line. To avoid these effects, termination resistors or termination networks which match the characteristic impedance of the transmission line are placed in parallel with the receiver circuit in order to dissipate the energy of the pulse and prevent reflections or "ringing".

It is also known that "differential" transmitter and receiver circuits have been used to eliminate noise problems on high speed transmitter/receiver interfaces, or on transmitter/receiver interfaces with long transmission lines. A differential transmitter will simultaneously send both a signal and its inverse to the differential receiver, rather than sending only a single signal. Ground voltage differences are therefore nullified between the transmitter circuit and receiver circuit, which provides high noise immunity. The use of differential signals also avoids the problem of voltage drop on the transmission line that is associated with "single-ended" transmission lines. A single-ended transmission line experiences a voltage drop due to the resistance of the transmission line, and this voltage drop decreases the low voltage threshold at the receiver circuit. Differential transmission signals have this voltage drop on both signals, whereby the effect of the voltage drop is cancelled out. A differential approach typically provides more than twice the noise margin of the corresponding single-ended approach.

In order to prevent reflections and ringing on a differential transmission line, the proper characteristic impedance of the differential transmission line must be maintained through the use of a differential termination network. A differential termination network must provide a termination impedance equal to the characteristic impedance of the transmission line at each of the two transmission line signals. It is well known that both signal paths of a high frequency differential transmission must be properly terminated in order to avoid reflections or ringing. There are inherent problems with prior known differential termination networks that occur in a system which requires the differential transmitter circuit to be powered by a voltage source separate from that of the differential receiver circuit and differential termination network.

A differential receiver circuit is designed so that its output signal switches from one logic state to the other when its input signals approach equal voltage potentials. This can create a problem if the transmission line driving the receiver becomes open circuited, which can occur if the transmission line itself is removed or damaged, or if the voltage which supplies the transmitter circuit fails when the receiver circuit is powered by a separate voltage source than that of the transmitter circuit. In a system which utilizes two separate and independent power domains, it is not unlikely that the voltage supplying power to the transmitter can fail, while the receiver remains powered up. The problem which could occur in this instance is that the two inputs of the differential receiver could float to an equal voltage level, thus causing the receiver output to come to rest at an indeterminate voltage level, or to continuously toggle.

The present invention solves the problem at the differential receiver circuit when the differential transmitter circuit signals are not present. In order to ensure that the receiver circuit's output signal does not continuously toggle, a voltage differential must be maintained at the inputs of the receiver circuit upon loss of the transmitter circuit signals. U.S. Pat. No. 4,567,384, by Stuhlmiller, issued Jan. 28, 1986, shows an example of a circuit which may be used with a EIA RS 422/423 receiver to hold the output signal of the receiver to a known output level when the input signals to the receiver become unavailable. The Stuhlmiller design utilizes transistors, resistors, and diodes to create the offset voltage, and it is used in addition to termination impedances. The present invention combines the functionality of a terminating impedance with the ability to provide a voltage differential to hold the receiver circuit in an inactive state upon loss of the transmitter circuit signals, without the need for additional components.

Another problem which has prompted a design feature in this termination network is that different types of differential receiver circuits may require different minimum voltages at the inputs of the receiver circuit. For instance, one type ECL differential receiver may require 2.0 volts minimum at the inputs for the low threshold voltage, while another type may require 2.6 volts minimum at the inputs. As previously stated, if the transmitter circuit fails or the transmitter supply voltage fails, the two input signals to the receiver circuit must be offset so that the it's output does not toggle. Therefore, the two voltages need to be offset from one another, but also may need to maintain a certain minimum voltage in order for the differential receiver circuit to operate correctly. For instance, the differential receiver circuit may require 2.6 volts minimum at the inputs, but the voltage divider termination resistances may only produce 2.2 volts (ignoring the offset voltages). This problem can be solved by providing a threshold voltage within the termination network which increases the two differential receiver input voltages to a minimum threshold voltage. This voltage can then be adjusted according to the minimum required input voltage of the particular differential receiver circuit, without the need to change the resistance values of the termination resistors.

The present invention also embodies a feature which solves a problem where the voltage that powers the differential receiver circuit is separate and independent from the voltage source that powers the differential transmitter circuit. If the voltage source that powers the receiver circuit was to fail, the failed voltage source would appear as a system ground. Since the differential transmitter circuit is expecting the differential receiver voltage to be present, the transmitter circuit could overdrive its DC output current capability when the failed voltage source appears as a system ground. In order to prevent current overdrive of the transmitter circuit upon loss of voltage to the receiver circuit, a resistance is placed between the termination impedance and ground. This separate resistance will effectively raise the equivalent resistance in the termination network when the receiver circuit's voltage has disappeared. The required termination resistances will not be affected by this extra resistance during normal operation however, because a bypass capacitor is used in parallel with the resistor. Therefore, the transmitter circuit is protected when the receiver circuit voltage fails, but during nominal operation the protecting circuitry will be transparent to the rest of the system.

Often Emitter Coupled Logic (ECL) is used for differential transmission because of its high speed characteristics. Although ECL circuitry has the favorable quality of high speed, ECL circuitry consumes a great deal of power. The resistance and bypass capacitor (which protects the transmitter circuit in the event of the receiver circuit's voltage failing) also operates to reduce the overall power consumption of the system during normal operation.

The present invention is intended to alleviate problems where a transmitter circuit and an associated receiver circuit are powered by different voltage sources. The termination network also provides current limiting to reduce power consumption, and provides flexibility in choosing a differential receiver circuit.

OBJECTS

It is a primary objective of this invention to provide an improved differential termination network.

It is another objective to provide an improved differential termination network for providing terminating impedance for a transmitter circuit and associated receiver circuit powered from separate power sources.

Still another objective if to provide an improved differential termination network that will protect a transmitter circuit from damage in the event of power loss to the receiver circuit and termination circuitry.

A further object of the invention is to provide an improved differential termination network that will place a differential receiver circuit output in a known state in the event of loss of power to a transmitter circuit or upon loss of differential receiver circuit input signals due to transmitter circuit failure or deficient electrical connections.

Another object of the present invention is to use common circuitry in providing both transmission line termination and functionality to place a differential receiver circuit output in a known state in the event of loss of power to a transmitter circuit or upon loss of differential receiver circuit input signals due to transmitter circuit failure or deficient electrical connections.

Still another objective of the invention is to provide an improved differential termination network that can be utilized with various families of circuit technologies, by providing the capability to adjust the differential receiver input voltage to ensure that the differential receiver will reach the low threshold voltage of the particular differential receiver upon receiving signals from the differential transmitter.

Yet another objective is to provide an improved differential termination network that uses inexpensive passive components, which reduces manufacturing complications and is inexpensive to fabricate.

Other more detailed objectives will become apparent from a consideration of the Drawings and the Detailed Description of the Preferred Embodiment.

SUMMARY OF THE INVENTION

This invention provides a differential termination network that may be used in conjunction with a differential transmitter circuit and differential receiver circuit which are connected by a pair of transmission lines. This differential termination network provides termination impedances at each of the transmission lines which is approximately equal to the characteristic impedance of its respective transmission line, which alleviates high frequency reflections on the transmission lines.

This differential termination network provides more than simply termination impedances to reduce reflections or ringing. Using the same components that provide the aforementioned matched impedance terminations, this invention also provides protection against erroneous differential receiver circuit output signals upon loss of receiver circuit input signals. In particular, this invention is responsive to conditions that may arise due to the use of differential transmitter circuits and differential receiver circuits powered by different voltage sources. Redundant voltage sources may be used in a system which requires high fault tolerance for data processing or data storage, where duplicate processes or duplicate data storage remain operational even if one voltage source fails. Where a differential transmitter circuit and a differential receiver circuit communicate across these redundant power domains, inherent problems arise when the transmitter circuit loses its power source. This will cause the differential transmitter circuit signal to disappear, which in turn can cause the inputs to the differential receiver circuit inputs to float to the same voltage level. Since a differential receiver circuit is designed to toggle its output when equivalent voltages are present at its input terminals, the differential receiver output could oscillate uncontrollably upon loss of the transmitter circuit signals. This invention will hold the differential receiver circuit in an inactive state if the power to the differential transmitter circuit has failed. This is accomplished without the need of extra voltage offset components, since the voltage offset is produced with the same components that comprise the terminating impedance.

Furthermore, the use of separate voltage sources could result in damage to the differential transmitter circuit if the voltage source supplying the differential receiver circuit and the termination network were to fail. In this case, the differential transmitter circuit could be supplying current to circuits which appear as system ground since their voltage source has failed. The termination network of this invention protects the differential transmitter circuitry from damage due to excessive current output if the power to the differential receiver circuit and differential termination network has failed.

In addition to the described protective features, two additional features are provided. One such feature is that the termination circuit provides extra DC current limiting for a lower power consumption termination network, while still providing the desired AC impedance to match the characteristic impedance of the transmission line. Another feature is an adjustable threshold voltage that provides flexibility of differential receiver specifications. If the differential receiver circuit inputs require a minimum operating voltage which is more than will be provided by the voltage divider pair, a threshold voltage may be applied to the differential termination network in order to ensure the minimum operating voltage at the inputs of the particular differential receiver circuit being used.

The foregoing and other more detailed and specific objectives will be made clear and understood from a consideration of the Drawings and the Detailed Description of the Preferred Embodiment.

DETAILED DESCRIPTION OF THE PREFERRED EMBODIMENT

Figure 1:
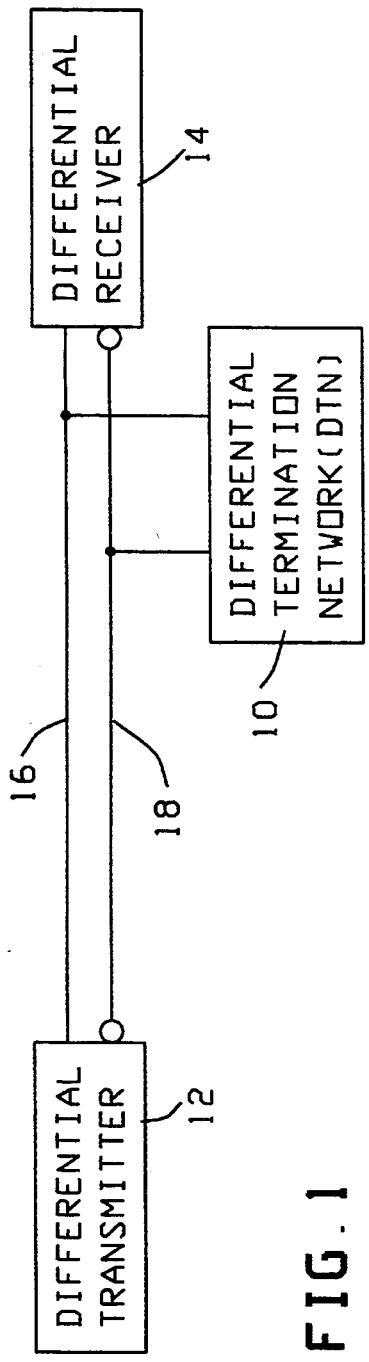
FIG. 1 is a block diagram of the Differential Termination Network and connections to the Differential Transmitter and Differential Receiver.

FIG. 1 is a block diagram of the Differential Termination Network and connections to the Differential Transmitter and Differential Receiver. The block diagram shows the Differential Termination Network (DTN) labelled 10, the Differential Transmitter labelled 12, and the Differential Receiver labelled 14. Differential transmitters and receivers such as those used in the preferred embodiment are commercially available. The Non-inverted Signal Line 16 provides the physical connection between the non-inverting Differential Transmitter output and the non-inverting Differential Receiver input and DTN. The Inverted Signal Line 18 provides the physical connection between the inverting Differential Transmitter output and the inverting Differential Receiver input and DTN.

In the preferred embodiment of the invention, the Differential Transmitter 12 and the Differential Receiver 14 are Emitter-coupled Logic (ECL) components. The fast rise and fall times of ECL circuitry require the use of the DTN 10 connected to the Differential Receiver to eliminate undesirable transmission line reflections and ringing.

Figure 2:
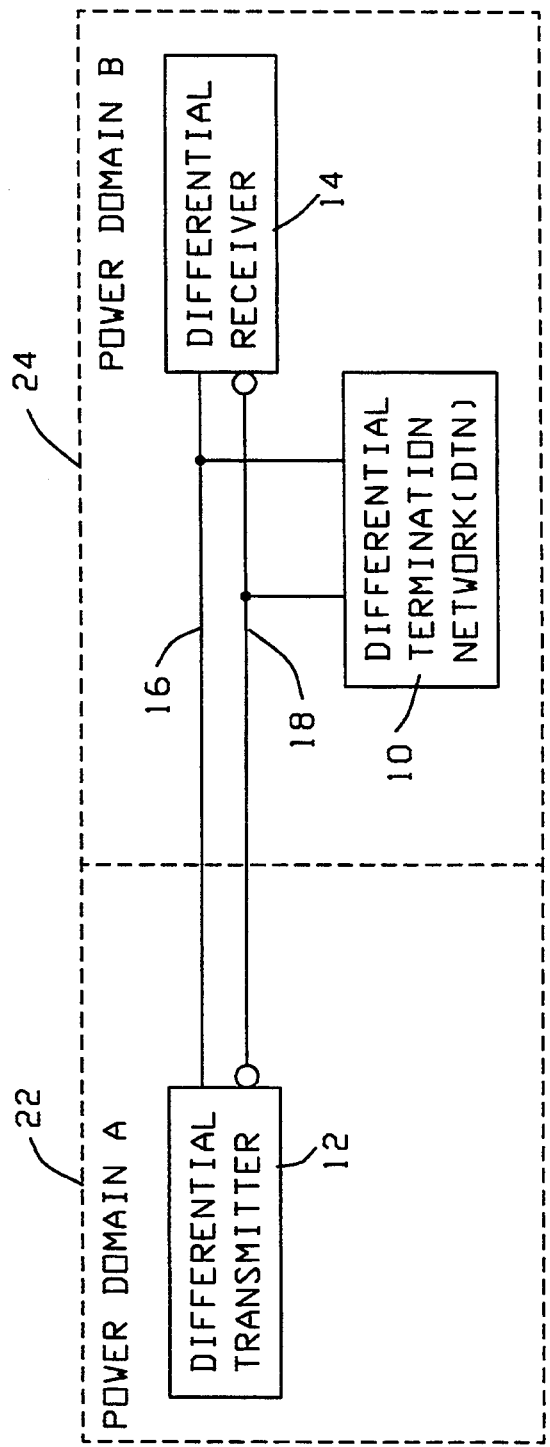
FIG. 2 is a block diagram of the Differential Termination Network and connections to the Differential Transmitter and Differential Receiver where the Differential Transmitter and Differential Receiver are powered by separate power domains.

FIG. 2 is a block diagram of the Differential Termination Network and connections to the Differential Transmitter and Differential Receiver where the Differential Transmitter and Differential Receiver are powered by separate power domains. For purposes of the present invention, a power domain is defined as an electrically isolated area in which the components within that area are supplied by separate voltage sources. Since the power domains are powered by separate voltage sources, the failure of one power domain's voltage source will not cause the circuitry in another power domain to cease operating. In the preferred embodiment, the system uses redundant power domains, Power Domain A 22 and Power Domain B 24, so that the failure of the supplying voltage source in one power domain will not cause the entire system to fail. The system referred to here consists of the transmitter/receiver circuitry as well as any other circuitry associated with the transmitter/receiver circuitry. Communication across the Power Domain Boundary 20 is necessary for proper coordination and control of the activities and processes occurring in Power Domains 22 and 24. The need to communicate across the Power Domain Boundary results in the Differential Transmitter 12 being powered by a different voltage source than that of the Differential Receiver 14 and the DTN 10.

Power Domain A 22 and Power Domain B 24 represent these two completely isolated voltage busses. Power Domain A provides voltage to the Differential Transmitter 12, and Power Domain B provides voltage to the Differential Receiver 14 and the DTN 10. It should be noted that this power domain configuration is not necessary for the operation of the DTN 10, but rather the DTN is designed to more effectively accommodate a system using redundant or multiple power domains. This capability will be described more fully in later portions of this description.

Figure 3:
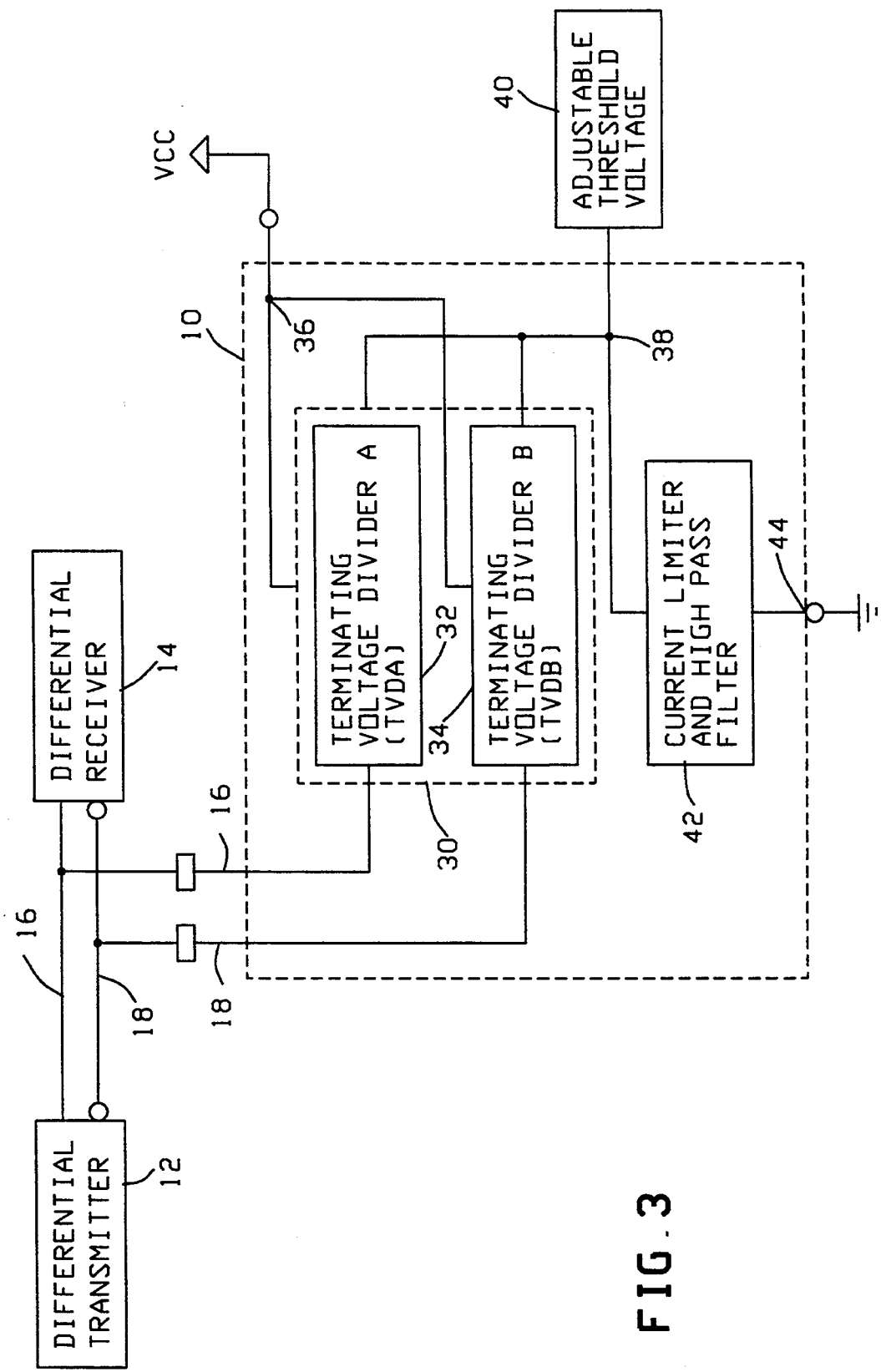
FIG. 3 is a block diagram of the elements comprising the Differential Termination Network, and its connection to the Differential Receiver.

FIG. 3 is a block diagram of the elements comprising the Differential Termination Network, and its connection to the Differential Receiver. The Non-inverted Signal Line 16 and the Inverted Signal Line 18 to the DTN 10 enter the Unbalanced Voltage Divider Pair 30. The Unbalanced Voltage Divider Pair is comprised of a 70.3 ohm Terminating Voltage Divider A (TVDA) 32 connected to Non-inverted Signal Line 16, and a 70.7 ohm Terminating Voltage Divider B (TVDB) 34 connected to Inverted Signal Line 18. Each Terminating Voltage Divider (TVD) in the Unbalanced Voltage Divider Pair is powered by a +5 volt VCC 36. At the output of each TVD in the Unbalanced Voltage Divider Pair is a Node 38 to the Adjustable Threshold Voltage 40.

The Terminating Voltage Dividers (TVDA) 32 and (TVDB) 34 provide approximately 70 ohms of terminating resistance necessary to prevent reflections or ringing on the Non-inverted Signal Line 16 and Inverted Signal Line 18 respectively, which each have approximately 70 ohms characteristic impedance. These TVDs also provide a voltage offset at the inputs of the Differential Receiver 14 to prevent it from becoming activated when the Power Domain A 22 loses power. This voltage offset will be discussed in detail in the discussion pertaining to FIG. 5.

A Current Limiter and High Pass Filter 42 is also connected to Node 38, which in turn is connected to ground via Node 44. Although ECL circuitry has the favorable quality of high speed, a drawback of ECL circuitry is that it consumes a great deal of power. The Current Limiter and High Pass Filter provides DC current limiting and protects the Differential Transmitter 12 if Power Domain B 24 powers down, while still allowing the high speed signals to recognize a 70 ohm termination. The operation of the Current Limiter and High Pass Filter will be discussed fully in the discussion pertaining to FIG. 6.

Figure 4:
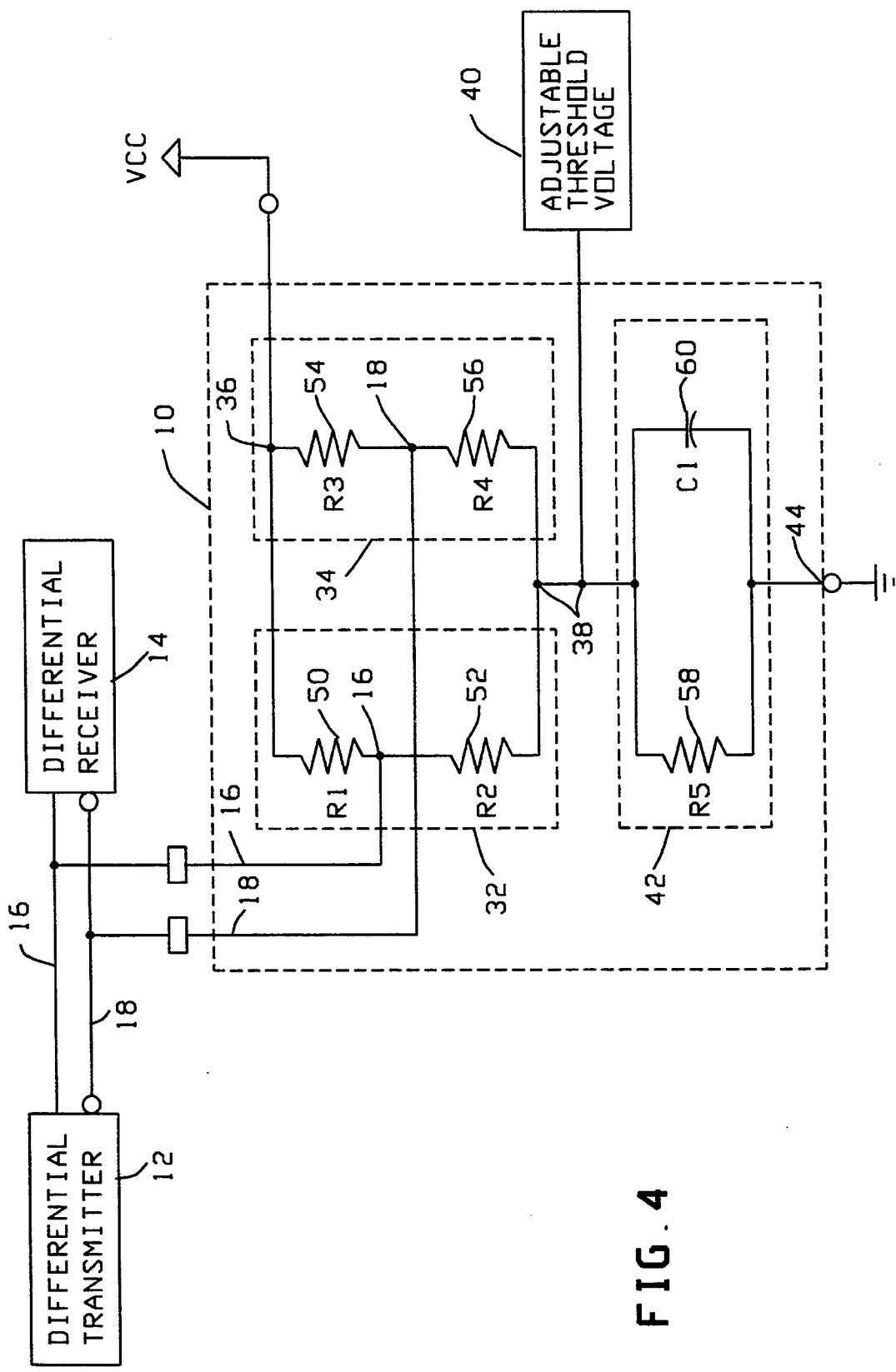
FIG. 4 is a schematic diagram of the elements comprising the Differential Termination Network.

FIG. 4 is a schematic diagram of the elements comprising the Differential Termination Network. Within the 70.3 ohm TVDA 32 are two resistors R1 and R2, labelled 50 and 52 respectively. Resistor R1 50 is connected between the +5 volt VCC 36 and the Non-inverted Signal Line 16. Resistor R2 52 is connected between the Non-inverted Signal Line 16 and Node 38. Within the 70.7 ohm TVDB 34 are two Resistors R3 and R4, labelled 54 and 56 respectively. Resistor R3 54 is connected between the +5 volt VCC 36 and the Inverted Signal Line 18. Resistor R4 56 is connected between the Inverted Signal Line 18 and Node 38.

The other two components comprise the Current Limiter and High Pass Filter 42. Resistor R5, labelled 58, and Capacitor C1, labelled 60, are coupled in parallel between Node 38 and Node 44.

Figure 5:
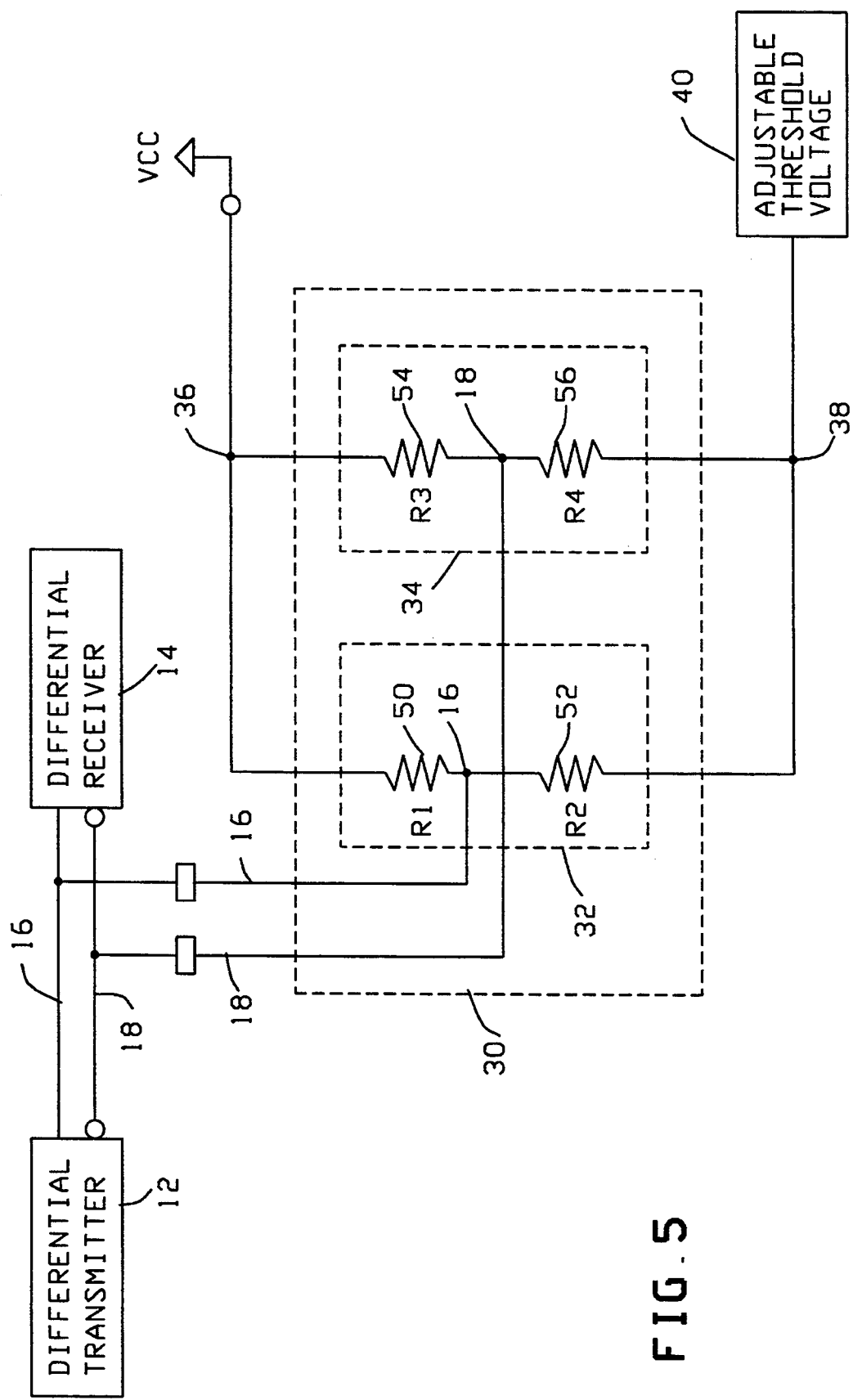
FIG. 5 is a schematic diagram of the Unbalanced Voltage Divider Pair, and its relation to the Adjustable Threshold Voltage.

FIG. 5 is a schematic diagram of the Unbalanced Voltage Divider Pair, and its relation to the Adjustable Threshold Voltage. For this embodiment, the Unbalanced Voltage Divider Pair 30 provides approximately 250 millivolts of voltage offset at the inputs of the Differential Receiver 14 to prevent the Differential Receiver from switching output logic levels or switching to an indeterminate logic level in the event that Power Domain A 22 loses power or the input signals to the Differential Receiver become unavailable. The Adjustable Threshold Voltage 40 provides a minimum operating voltage at the input terminals of the Differential Receiver 14.

A 250 millivolt offset at the inputs of the Differential Receiver 14 will hold the inputs of the Differential Receiver at an unequal voltage in the event that Power Domain A 22 loses power. Differential receivers are designed to toggle from one voltage level output to the other when its inputs are at an equal voltage. If Power Domain A loses its voltage for any reason, the two outputs of the Differential Transmitter 12 would appear to be an open circuit due to its high impedance characteristics, and if the two voltage dividers were symmetric, the inputs to the Differential Receiver would be equal, thus causing the output of the Differential Receiver to toggle arbitrarily. To circumvent this problem, the two TVDS 32 and 34 are not symmetric.

Before discussing the non-symmetry of the Unbalanced Voltage Divider Pair 30, some background information on the operation of TVDA 32 and TVDB 34 will be helpful to understand the operation. In the preferred embodiment, Resistor R1 50 has a nominal value of 4,220 ohms and Resistor R2 52 has a nominal value of 71.5 ohms. Therefore TVDA 32 has an equivalent resistance of 70.3 ohms. Resistor R3 54 has a nominal value of 576 ohms and Resistor R4 56 has a nominal value of 80.6 ohms. Thus TVDB 34 has an equivalent resistance of 70.7 ohms. These two equivalent resistances each provide approximately 70 ohms of terminating resistance to match the characteristic impedance of the transmission line. In its active high state, the voltage at the Non-inverted Signal Line 16 has a voltage of approximately +4.1 volts due to an approximate 0.9 volt voltage drop across a diode (not shown) in the non-inverting output of Differential Transmitter 12. In its active low state, the voltage at the Inverted Signal Line 18 has a voltage of approximately +3.2 volts due to an approximate 0.9 volt voltage drop across two diodes (not shown) in the inverting output of the Differential Transmitter. When the Differential Transmitter sends a signal, the active high state (approximately +4.1 volts) on the Non-inverted Signal Line 16 will drop to the active low state (approximately +3.2 volts), and the active low state (approximately +3.2 volts) on the Inverted Signal Line 18 will raise to the active high state (approximately +4.1 volts). During this simultaneous transition, there will be a point where the two voltage levels are equal, which is the point when the Differential Receiver 14 output begins to switch from its present logic level to the opposite logic level (i.e., from a high logic level to a low logic level, or vice versa). Therefore, when Power Domain A 22 is properly supplied with +5 volts, the Non-inverted Signal Line 16 and Inverted Signal Line 18 will correctly direct the output signal of the Differential Receiver. During these transitions, TVDA 32 and TVDB 34 will be providing a nominal 70 ohm termination resistance for proper termination. It should be noted that the resistance values and resulting voltage levels indicated for the preferred embodiment need not be the exact values stated. Resistances which provide an equivalent resistance approximately equal to the characteristic impedance of the transmission line while continuing to provide a sufficient voltage offset at the Differential Receiver inputs will produce a similar result.

A problem arises when Power Domain A 22 loses power and Power Domain B 24 remains powered up and active. This is not unlikely in a system which takes advantage of redundant power domains. A similar problem arises if the Differential Transmitter 12 were to become defective and open circuit. If either of these events were to occur, it is important to hold the Differential Receiver 14 in an inactive state so that it does not appear to be receiving valid input signals from the Differential Transmitter. This is accomplished by designing the TVDs so that they produce a slightly offset voltage at the inputs to the Differential Receiver when Power Domain A loses power. It is also necessary to provide the DTN 10 with its own +5 volt VCC 36, which in this embodiment, is from Power Domain B. In the preferred embodiment, when Power Domain A loses power, a nominal +2.6 volts is the voltage applied at the Adjustable Threshold Voltage 40, and with this voltage, the calculated voltage on the Non-inverted Signal Line 16 will be +2.640 volts. The calculated voltage on the Inverted Signal Line 18 will be 2,895 volts. The combination results in about a 255 millivolt differential at the inputs of the Differential Receiver, which is sufficient to prevent its output from oscillating.

FIG. 5 also shows the connection of the Adjustable Threshold Voltage 40 to the two Terminating Voltage Dividers 32 and 34 through Node 38. This adjustable voltage is used so that the minimum voltage required for proper operation of the Differential Receiver 14 is present at the inputs of the Differential Receiver should Power Domain A 22 lose power, or in the event that the signals from the Differential Transmitter 12 fail to properly reach the Differential Receiver. During normal operation, the signals received by the Differential Receiver 14 are comprised of voltage levels within the specified input voltage operating range. However, upon loss of these signals or where Power Domain A 22 fails, the voltage supplied to the inputs of the Differential Receiver 14 is derived from TVDA 32 and TVDB 34. Depending upon the type of receiver used, the low threshold voltage may be adequately supplied by the voltage provided by TVDA 32 and TVDB 34, however this voltage may not be adequate to reach the low threshold voltage of other types of receivers. Therefore, rather than being forced to change the resistance values of TVDA 32 and TVDB 34, an Adjustable Threshold Voltage 40 may be connected to effectively raise the voltage level provided by TVDA and TVDB, which ensures reaching the low threshold voltage of the Differential Receiver 14. For example, if the Differential Receiver 14 requires about +2.6 volts minimum at the inputs in order to function correctly, then the Adjustable Threshold Voltage 40 can be set to about +2.6 volts to be applied to Node 38. If a different type of Differential Receiver requires a minimum voltage at its inputs which is less than the voltage that would be produced at the Non-inverted Signal Line 16 and the Inverted Signal Line 18 without the Adjustable Threshold Voltage, then no voltage needs to be applied, and the input may be left open circuited. This provides for a common design which can be used regardless of the type of Differential Receiver utilized. It should be noted that the desired voltage offset at the inputs of the Differential Receiver 14 to hold the Differential Receiver output in a known state will be present with or without the use of the Adjustable Threshold Voltage 40.

The Adjustable Threshold Voltage 40 performs in conjunction with the 70.3 ohm TVDA 32 and the 70.7 ohm TVDB 34. The unbalanced voltage dividers provide the offset voltage to prevent the Differential Receiver 14 from producing spurious output signals, and the Adjustable Threshold Voltage provides the minimum voltage to ensure that the Differential Receiver will be able to reach its low threshold voltage. The components used in the preferred embodiment produce a voltage of approximately +2.640 volts at the Non-inverted Signal Line 16, and a voltage of approximately +2.895 volts at the Invented Signal Line 18 which shows that the voltage is above the +2.6 volt minimum threshold voltage, and that an approximate 250 millivolt differential exists to hold the Differential Receiver in an inactive state.

In the preferred embodiment, the Adjustable Threshold Voltage 40 was selected to be a +2.6 volt regulator. Therefore, while the Adjustable Threshold Voltage can be a selectable voltage reference, a fixed voltage regulator was implemented in the preferred embodiment in order to provide for ease of manufacturing. It is therefore an option to replace the Adjustable Threshold Voltage with a fixed voltage reference, where the same type of differential receiver with a known low threshold voltage will be used.

Figure 6:
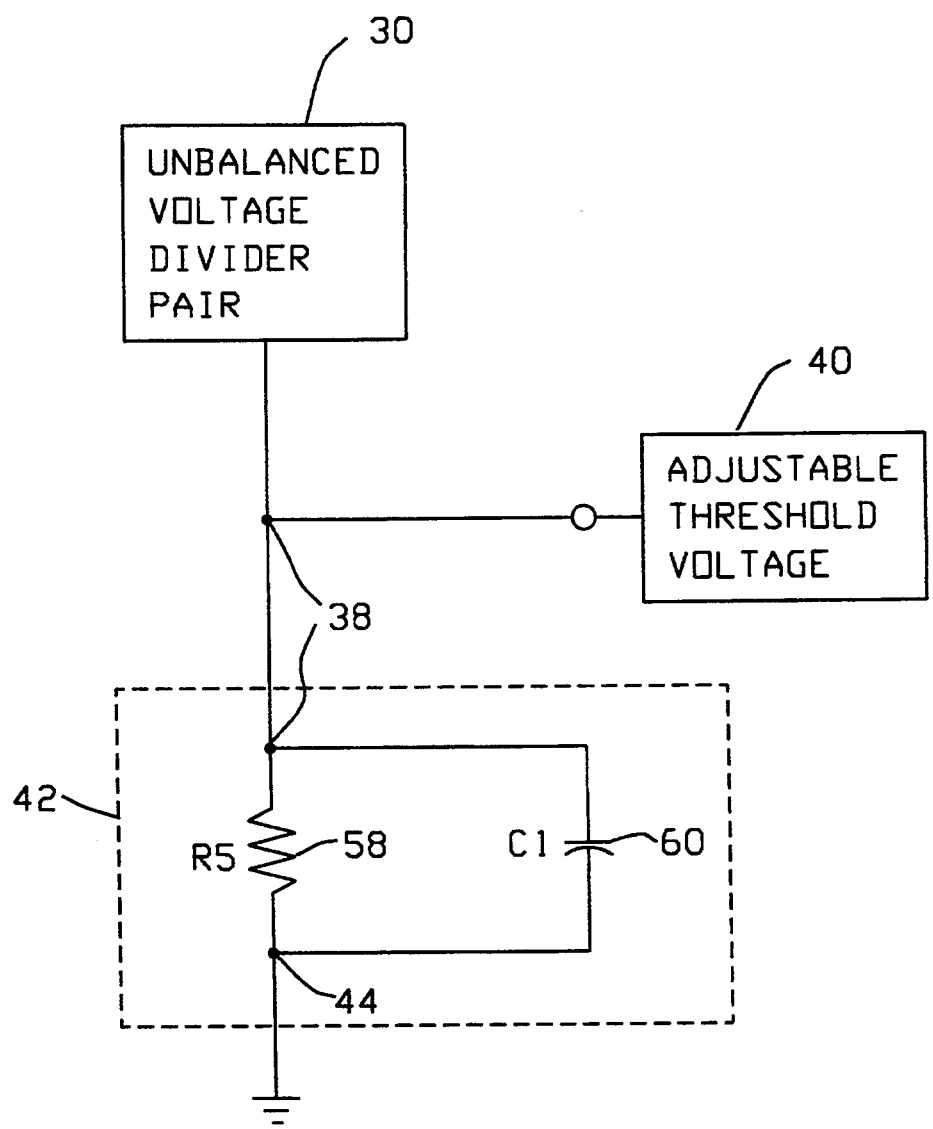
FIG. 6 is a schematic diagram of the Current Limiter and High Pass Filter.

FIG. 6 is a schematic diagram of the Current Limiter and High Pass Filter. The Current Limiter and High Pass Filter 42 provides DC current limiting while allowing the DTN 10 to maintain a nominal 70 ohm AC termination resistance. The DC current limiting helps keep power consumption low, but more importantly, it protects the Differential Transmitter 12 in the event that Power Domain B 24 loses power and Power Domain A 22 remains powered up.

Transmission line reflections only occur when the signal being transmitted is changing voltage levels. The DTN 10 will provide approximately 70 ohms of termination resistance to match the characteristic impedance of the transmission line. If the signal being transmitted has stabilized, Resistor R5 58, which is nominally 124 ohms for this embodiment, will limit the current provided by the Differential Transmitter 12. At that point, the approximate 70 ohm equivalent termination resistance does not have to be a matched 70 ohm termination because the switching signals have settled down, and reflections and ringing will no longer occur. Therefore, the Resistor R5 58 will provide an additional 124 ohms of resistance, and the DC resistance will be 124 ohms plus 70 ohms, or about 194 ohms.

The DC current limiting is more importantly used to limit the DC current when Power Domain B 24 powers down. This may occur in a system that uses two power domains for redundancy, or supply requirements. If Power Domain B powers down, and Power Domain A 22 remains powered up, the Differential Transmitter 12 may overdrive its current driving capability. This can occur because the +5 volt VCC 36 will appear as a system ground when Power Domain B powers down. The equivalent resistances of the two TVDs 32 and 34 will not provide enough resistance to protect the Differential Transmitter from damage due to excessive current output. Therefore, the addition of Resistor R5 58 creates a higher equivalent resistance. For instance, on TVDA 32, an equivalent resistance of Resistor R1 50 (4,220 ohms) in parallel with Resistor R2 52 (71.5 ohms) plus Resistor R5 58 (124 ohms) will be seen instead of an equivalent resistance of Resistor R1 50 in parallel with Resistor R2 52 only. The additional resistance is enough so that the Differential Transmitter 12 will not be damaged if Power Domain B powers down.

Finally, Capacitor C1 60, which is nominally 0.01 microfarads for this embodiment, is placed in parallel with Resistor R5 58 so that the DTN 10 can maintain a nominal 70 ohm impedance during signal transitions on the Non-inverted Signal Line 16 and the Inverted Signal Line 18. Since the Resistor R5 58 is necessary as described above, the Capacitor C1 60 provides an AC short circuit to ground on high speed transitions on the Non-inverted Signal Line 16 and the Inverted Signal Line 18. Therefore, Capacitor C1 60 allows Resistor R5 58 to be bypassed during transmission signals, and a 70 ohm nominal termination impedance can be maintained.

From the foregoing it can be seen that the various objectives and purposes have been achieved. The use of unbalanced terminating voltage dividers, current limiting, and an adjustable threshold voltage provide a termination network which is fault tolerant, power conscientious, and adaptable to various differential communication interfaces.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended Claims.

What is claimed is:

1. For use in a circuit having first and second reference voltages and system ground, a differential termination network for terminating differential signals propagated along a pair of transmission lines that connect two outputs of a differential transmitter to two associated input terminals of a differential receiver, comprising:

a first terminal to be connected to the first receiver input terminal of the differential receiver;

a second terminal to be connected to the second receiver input terminal of the differential receiver; pl a first resistive element having a first lead connected to said first terminal and a second lead for connecting to the first reference voltage;

a second resistive element having a third lead connected to said first terminal and a fourth lead for connecting to the second reference voltage, said second resistive element having a lower resistance than the resistance of said first resistive element, and said first and second resistive elements forming an equivalent resistance approximately equal to the characteristic impedance of the first transmission line;

a third resistive element having a fifth lead connected to said second terminal and a sixth lead for connecting to the first reference voltage; and a fourth resistive element having a seventh lead connected to said second terminal and an eighth lead for connecting to the second reference voltage, said fourth resistive element having a lower resistance than the resistance of said third resistive element, and said third and fourth resistive elements forming an equivalent resistance approximately equal to the characteristic impedance of the second transmission line, and having a greater equivalent resistance than that of the equivalent resistance formed by said first and second resistive elements, whereby a voltage is provided at said second terminal which differs from a voltage provided at said first terminal by an amount sufficient to ensure a stable output at the differential receiver upon loss of the differential signal to the differential receiver input terminals or loss of power to the differential transmitter.

2. A differential termination network as in claim 1, and further including a variable reference voltage source coupled to said fourth lead and said eighth lead, whereby a fixed offset voltage is provided at the input terminals of the differential receiver to ensure that the differential receiver will reach its low threshold voltage upon receiving signals from the differential transmitter.

3. A differential termination network as in claim 2, and further including:

a fifth resistive element connected between said variable reference voltage source and the system ground; and a capacitance connected in parallel with said fifth resistive element, whereby current limiting is provided to prevent the differential transmitter from current overdrive upon loss of reference voltages, and matched termination impedances are maintained.

4. For use in a circuit having first, second, and third reference voltages, a terminated differential transmitter/receiver circuit, comprising:

a differential transmitter having first and second transmitter output terminals for distributing a differential signal, and having first power terminals for connecting to a first voltage source;

first and second transmission lines each having associated first and second transmission line input terminals coupled to said first and second transmitter output terminals respectively, and having first and second transmission line output terminals;

a differential receiver having first and second receiver input terminals coupled to said first and second transmission line output terminals respectively, and having second power terminals for connecting to a second voltage source;

a first terminating impedance approximately equal to the characteristic impedance of said first transmission line, and including a first resistive element having a first lead coupled to said first transmission line and a second lead coupled to the first reference voltage, and a second resistive element of lesser value than said first resistive element having a third lead coupled to said first transmission line and a fourth lead coupled to the second reference voltage; and a second terminating impedance approximately equal to the characteristic impedance of said second transmission line, and including a third resistive element having a fifth lead coupled to said second transmission line and a sixth lead coupled to the first reference voltage, and a fourth resistive element of lesser value than said third resistive element having a seventh lead coupled to said second transmission line and an eighth lead coupled to the second reference voltage, whereby said first and second receiver input terminals of said differential receiver are biased to prevent the output of said differential receiver from spuriously oscillating due to either the loss of the differential signal to said first and second receiver input terminals, or the loss of the first voltage source to said differential transmitter.

5. A terminated differential transmitter/receiver circuit as in claim 4, wherein said first lead is coupled to said first receiver input terminal, said third lead is coupled to said first receiver input terminal, said fifth lead is coupled to said second receiver input terminal, and said seventh lead is coupled to said second receiver input terminal.

6. A terminated differential transmitter/receiver circuit as in claim 4, wherein said first power terminals of said differential transmitter and said second power terminals of said differential receiver receive voltage from a single voltage source.

7. A terminated differential transmitter/receiver circuit as in claim 4, wherein said second reference voltage is adjustable, whereby a fixed offset approximately equal to the low input voltage threshold of the differential receiver is provided at the inputs of the differential receiver.

8. A terminated differential transmitter/receiver circuit as in claim 4, further including:

a fifth resistive element having a ninth lead coupled to said fourth lead and said eighth lead, and a tenth lead for connecting to the third reference voltage; and a capacitive element connected in parallel with said fifth resistive element, whereby current limiting is provided to prevent the differential transmitter from current overdrive upon loss of said first and second reference voltage, and matched termination impedances are maintained.

9. A differential termination network for terminating differential signals propagated along a pair of transmission lines that connect two outputs of a differential transmitter to two associated inputs of a differential receiver, comprising:

a first terminal that may be connected to a first receiver input terminal of a differential receiver;

a second terminal that may be connected to a second receiver input terminal of the differential receiver;

first termination means connected to said first terminal for attenuating signal reflection on said first transmission line, said first termination means further providing a first voltage level to the first receiver input terminal of the differential receiver;

second termination means connected to said second terminal for attenuating signal reflection on said second transmission line, said second termination means further providing a second voltage level to the second receiver input terminal of the differential receiver, said second voltage level being greater than said first voltage level for preventing the output of the differential receiver from spuriously oscillating upon loss of the differential signal to the first and second receiver input terminals; and base voltage means for establishing a base voltage at the first and second receiver input terminals of the differential receiver upon which said first and second voltage levels are superimposed, said base voltage providing a fixed voltage offset to ensure reaching the low threshold voltage of the differential receiver.

10. A differential termination network as in claim 9, further including:

means for reducing DC power consumption without affecting the high frequency impedance of said first or second termination means; and means for providing DC current limiting protection for the differential transmitter upon loss of a first supply voltage to the differential receiver, where a second supply voltage to the differential transmitter continues to effectively supply the differential transmitter with voltage.

11. A differential termination network as in claim 10, further including means for adjusting said base voltage means to ensure that the differential receiver will reach its low threshold voltage upon receiving signals from the differential transmitter.

* * * * *